No. 634,205. Patented Oct. 3, 1899.
P. DIEHL & F. MÜLLER.
PITMAN.
(Application filed Nov. 12, 1898.)
(No Model.)
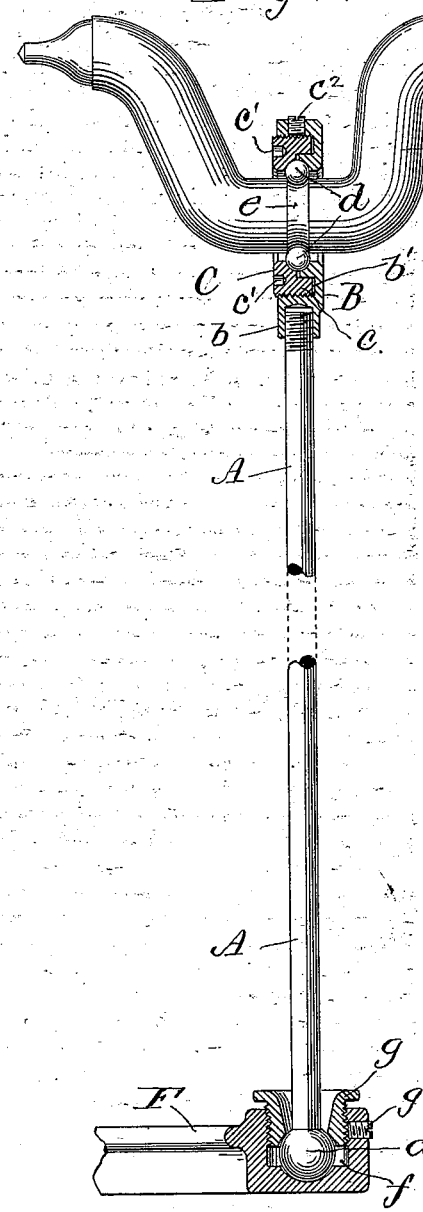
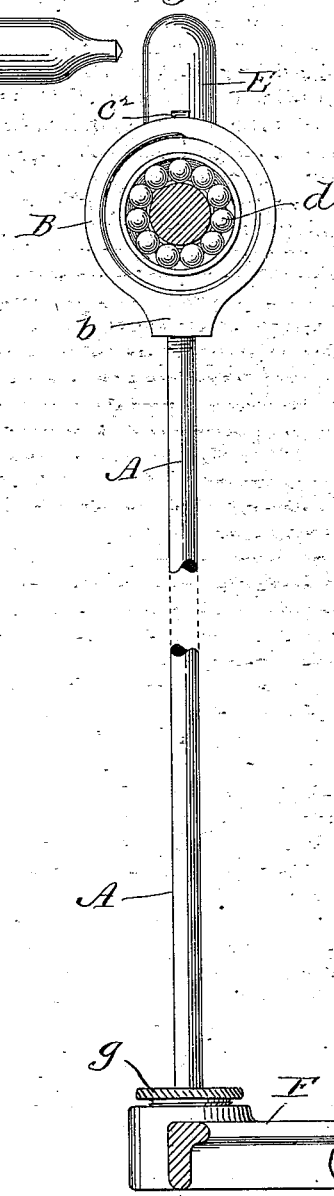
Witnesses:
C. M. Sweeney
Inventors:
Philip Diehl
Friederich Müller

UNITED STATES PATENT OFFICE.

PHILIP DIEHL AND FRIEDERICH MÜLLER, OF ELIZABETH, NEW JERSEY, ASSIGNORS TO THE SINGER MANUFACTURING COMPANY, OF NEW JERSEY.

PITMAN.

SPECIFICATION forming part of Letters Patent No. 634,205, dated October 3, 1899.

Application filed November 12, 1898. Serial No. 696,220. (No model.)

*To all whom it may concern:*

Be it known that we, PHILIP DIEHL and FRIEDERICH MÜLLER, citizens of the United States, residing at Elizabeth, in the county of Union and State of New Jersey, have invented certain new and useful Improvements in Pitmen and Connected Parts, of which the following is a specification, reference being had therein to the accompanying drawings.

This invention has for its object to provide a novel ball-bearing pitman of simple construction for use in sewing-machine stands and for other purposes.

To this end the improved pitman comprises a rod or bar one end of which is provided with a strap on which is preferably formed one part of the pitman ball-race, the other part of the pitman ball-race being formed on an adjustable ring or cap which has a screw-threaded engagement with the strap and which serves to hold the balls in place. To prevent lateral movement or displacement of the pitman in operation, the crank in connection with which the pitman is to operate is preferably provided with an annular groove, which forms the crank ball-race. The ball-bearing strap portion of the pitman may, if desired, be made oil-retaining and dust-proof, as by the use of felt or other washers applied in any suitable or well-known manner. For connection to a treadle the lower end of the pitman is provided with a ball, forming part of an adjustable ball-and-socket joint, preferably comprising an oil-pocket, in which the ball end of the pitman is held by a cup-screw, which may be adjusted to take up wear.

In the accompanying drawings, Figure 1 is a sectional elevation of the improved pitman and connecting parts, and Fig. 2 is a view at right angles to Fig. 1 with the crank in section and the ball-retaining ring or cap removed.

Referring to the drawings, A denotes a rod or bar forming the body of the pitman, provided at its lower end with a ball $a$.

B is a strap consisting, preferably, of an internally-threaded steel ring, the central opening in which is greater in diameter than the crank, so that in assembling the parts the pitman-strap may be readily passed over the crank. The interior of the ring or strap has a concaved or beveled part, forming a portion of the ball-race, and the said strap has a lug $b$, having a threaded hole for the reception of the threaded upper end of the rod A, thus providing for an adjustment in the length of the pitman.

C is a screw ring or cap, the inner edge of which is concaved or beveled to form a part of the race for the circular series of balls $d$, which are retained in place by the said ring or cap. To afford a strong screw connection between the strap or ring B and the cap C without making the former objectionably thick, an annular recess or groove $b'$ is preferably formed in the said strap or ring outside of the ball-race part thereof to receive a lip or flange $c$ of the screw-threaded ring or cap C.

E is a crank adapted for use in a sewing-machine stand and to which a driving-wheel or pulley (not shown) is to be affixed, this crank having at its central portion an annular groove $e$, forming part of the race for the balls $d$, said groove preventing lateral displacement of the pitman when the parts are assembled, as will be understood.

F denotes a part of a treadle provided with a cup $f$ to receive the ball $a$ on the rod or bar A, the interior of said cup being adapted to serve as an oil-pocket as well as a socket for the ball $a$. The ball $a$ on the rod or bar A is held in the cup $f$ by a cup-screw $g$, having a screw-threaded connection with the cup $f$ and provided with flaring sides, which allow the pitman to swing back and forth as the crank E rotates. The cup-screw $g$ can be turned down when necessary to take up any wear of the ball-and-socket joint formed by the ball $a$, the pocket in the cup $f$, and the cup-screw $g$, while any wear of the ball-bearing at the upper end of the pitman can be readily taken up by simply screwing in the ring C slightly by a wrench or tool adapted for engagement with the recesses $c'$, formed in the outer face of the said ring. The ring C may be retained in any proper position of adjustment by a set-screw $c^2$, and the cup-screw $g$ may be similarly retained in place by a set-screw $g'$.

Having thus described our invention, we claim and desire to secure by Letters Patent—

1. In a pitman, the combination with a pitman rod or bar, of a strap at one end thereof and on the inner portion of which is formed a part of a ball-race, said strap being provided with an annular groove outside of said ball-race part, a ring or cap having a screw-threaded connection with said strap and provided with a portion of a ball-race and with an annular flange or lip extending into said annular groove in said strap, and a series of balls between said cap and strap.

2. The combination with a crank having an annular groove, of a pitman rod or bar, a strap at one end of said pitman rod or bar and on the inner portion of which strap is formed a part of a ball-race, said strap being provided with an annular groove outside of said ball-race part, a ring or cap having a screw-threaded connection with said strap and provided with a portion of a ball-race and with an annular flange or lip extending into said annular groove in said strap, and a series of balls between said cap, strap and crank.

3. The combination of a crank having an annular groove, of a pitman rod or bar provided at its lower end with a ball $a$, a strap at the upper end of said pitman rod or bar and on the inner portion of which strap is formed a part of a ball-race, said strap being provided with an annular groove outside of said ball-race part, a ring or cap having a screw-threaded connection with said strap and provided with a portion of a ball-race and with an annular flange or lip extending into said annular groove in said strap, a series of balls between said cap, strap and crank, a horizontal treadle part having an oil cup or pocket, and means for securing the lower end of said pitman in said oil cup or pocket.

In testimony whereof we affix our signatures in the presence of two witnesses.

PHILIP DIEHL.
FRIEDERICH MÜLLER.

Witnesses:
HENRY CALVER,
HENRY J. MILLER.